US012435564B2

(12) United States Patent
Gendler

(10) Patent No.: US 12,435,564 B2
(45) Date of Patent: Oct. 7, 2025

(54) BEAD SADDLE ATTACHMENT COMPONENT

(71) Applicant: CornellCookson, LLC, Mountain Top, PA (US)

(72) Inventor: George Gendler, Mountaintop, PA (US)

(73) Assignee: CornellCookson, LLC, Mountain Top, PA (US)

( * ) Notice: Subject to any disclaimer, the term of this patent is extended or adjusted under 35 U.S.C. 154(b) by 403 days.

(21) Appl. No.: 18/071,142

(22) Filed: Nov. 29, 2022

(65) Prior Publication Data

US 2024/0175316 A1 May 30, 2024

(51) Int. Cl.
*E06B 9/56* (2006.01)
*E06B 9/171* (2006.01)
*E06B 9/58* (2006.01)

(52) U.S. Cl.
CPC ................ *E06B 9/58* (2013.01); *E06B 9/171* (2013.01)

(58) Field of Classification Search
CPC ..... E06B 9/11; E06B 9/13; E06B 9/15; E06B 9/17; E06B 9/171; E06B 2009/1716
See application file for complete search history.

(56) References Cited

U.S. PATENT DOCUMENTS

| | | | | |
|---|---|---|---|---|
| 1,641,506 | A * | 9/1927 | Smurr | E06B 9/60 160/315 |
| 2,125,498 | A * | 8/1938 | Hagenbook | E06B 3/90 49/465 |
| 2,556,352 | A * | 6/1951 | Wellensiek | E06B 9/302 160/169 |
| 3,640,332 | A | 2/1972 | Luby et al. | |
| 3,734,161 | A * | 5/1973 | Pierce | E06B 9/60 160/40 |
| 4,294,302 | A | 10/1981 | Ricke | |
| 4,519,434 | A * | 5/1985 | Forquer | E06B 9/171 160/133 |
| 4,986,331 | A * | 1/1991 | Henkenjohann | E05F 15/67 160/311 |
| 5,172,744 | A * | 12/1992 | Finch | E06B 9/174 160/133 |
| 5,205,336 | A * | 4/1993 | Munekata | E06B 9/15 160/133 |
| 5,265,663 | A * | 11/1993 | Munekata | E06B 9/15 160/133 |
| 5,275,223 | A * | 1/1994 | Magro | E06B 9/60 160/133 |
| 8,985,179 | B2 * | 3/2015 | Steffen | E06B 9/171 160/133 |
| 10,344,527 | B2 * | 7/2019 | Balbach | E06B 9/174 |
| D932,654 | S * | 10/2021 | Hurst | D25/48.4 |
| 11,391,087 | B2 * | 7/2022 | Brunton | E06B 9/582 |

(Continued)

OTHER PUBLICATIONS

International Search Report and Written Opinion mailed in corresponding PCT Application No. PCT/US2022/051216 mailed on Feb. 23, 2023, 10 pages.

*Primary Examiner* — Johnnie A. Shablack

(57) ABSTRACT

In example implementations, a bead saddle attachment component for a curtain is provided. The bead saddle attachment component includes a body, a plurality of bead saddle features on an exterior side of the body, a spacer bracket receiving feature on the exterior side of the body, and an alignment feature on the exterior side of the body.

18 Claims, 8 Drawing Sheets

(56) References Cited

U.S. PATENT DOCUMENTS

| | | | | |
|---|---|---|---|---|
| 2009/0020238 | A1* | 1/2009 | Barbulescu | E06B 9/74 160/321 |
| 2015/0107784 | A1 | 4/2015 | Voigt | |
| 2024/0175316 | A1* | 5/2024 | Gendler | E06B 9/171 |

* cited by examiner

BEAD SADDLE ATTACHMENT COMPONENT

BACKGROUND

Vertically moving doors can be used for a variety of applications. For example, vertically moving doors can be used as garage doors in residential locations or doors for bays and entrances to warehouses in commercial locations.

Some vertically moving doors can be pulled open via a rotating barrel or shaft in combination with a motor. A door can be connected to the barrel, opened by wrapping the door around the barrel, and closed by unwinding the door from the barrel. The motor can drive the barrel to rotate in a clockwise or counterclockwise direction to open or close the door.

DETAILED DESCRIPTION

Figure 1:
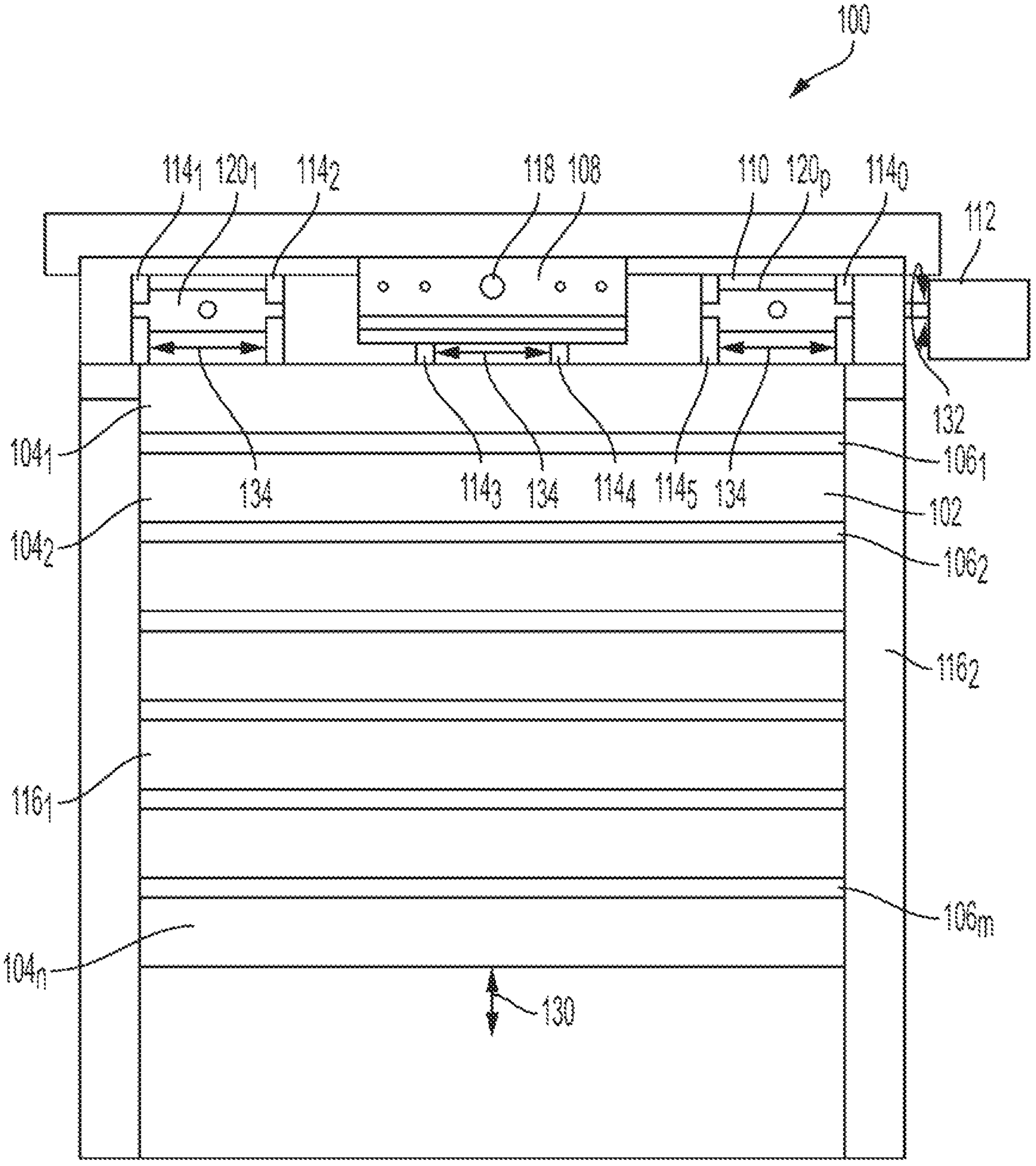
FIG. 1 illustrates a block diagram of a rolling door system with example bead saddle attachment components of the present disclosure.

Examples described herein provide examples of a bead saddle attachment component for rolling door systems and methods for opening a curtain of a rolling door system with a bead saddle attachment component. As discussed above, some vertically moving doors can be pulled open via a rotating barrel or shaft in combination with a motor. The curtain of the door can be connected to the barrel, opened by wrapping the curtain around the barrel, and closed by unwinding the door from the barrel. The motor can drive the barrel to rotate in a clockwise or counterclockwise direction to open or close the curtain of the door.

The door may be a rolling door that is fabricated from interconnected panels that form the curtain of the door. The adjacent panels may be connected via a bead that forms a hinge between panels. The hinge may allow the panels to move or to be angled to one another to allow the curtain to wrap around the shaft.

However, due to the shape and design of the door, the curtain may not perfectly wrap around the barrel when the door is opened. The initial wrap (wherein the panels are in proximate contact with the barrel surface) may not be "tight" enough or consistent. For certain installations, there may be limited headroom. As a result, if the curtain is not wrapped around the barrel consistently or "tightly" enough, there may be insufficient headroom for the door curtain to be completely opened or wrapped around the barrel.

In other instances, the curtain may not be square when wrapping around the barrel. This may lead to alignment issues that may cause the door to open and close improperly or to fail to open and close at all.

The present disclosure provides a bead saddle attachment component that address the issues associated with rolling doors noted above. The bead saddle attachment component may include features that can catch the beads between panels as the curtain is rolled open around the barrel. The features on the bead saddle component that catch the beads can ensure a tight initial wrap and prevent drift (e.g., where the curtain is not wound about the barrel consistently from left to right) with each rotation of the barrel as the curtain is wrapped around the barrel.

In one embodiment, the bead saddle attachment component may also include features to align multiple bead saddle components attached to the barrel. This may ensure that the door curtain is "square" when attached to the barrel, during the initial wrap around barrel as the door is opened, and during subsequent wraps (wherein the panels of the curtain are in proximate contact with the panel surface from the previous wrap).

In one embodiment, the bead saddle attachment component may also provide additional connection points to attach the door curtain. Thus, the curtain may be securely attached to the barrel with fewer fasteners.

In one embodiment, the bead saddle attachment component may also be installed during manufacturing of the barrel. Traditionally, attachment rings are installed on the barrel in the field. As a result of having the bead saddle attachment component during manufacturing of the barrel, the barrel may be shipped to the customer for installation with the bead saddle attachment components already attached in proper alignment to ensure that the curtain of the door is aligned. This may prevent some alignment issues caused by manual installation of the components by a technician. Thus, the bead saddle attachment component of the present disclosure provides features that allow a rolling door to open and close more consistently and to avoid the issues with currently designed rolling doors described above.

In addition to the benefits noted above, the bead saddle attachment component of the present disclosure may provide additional benefits. For example, the bead saddle attachment component of the present disclosure may reduce finish wear on the slats, may reduce contact noise during door operation, may allow the curtain to wrap tighter on the barrel resulting in a smaller required storage space, may allow the curtain to roll-up squarely, causing less demand on the motor, less metal to metal contact, and less stress on all of the components of the system, may lead to a longer life and greater reliability of the door system, and may provide overall better performance (e.g., speed, consistency of operation, less trouble shooting, and the like) of the door system in daily operation, as well as over the door system's lifetime.

FIG. 1 illustrates a block diagram of a rolling door system 100 of the present disclosure. It should be noted that the rolling door system 100 in FIG. 1 has been simplified for ease of explanation. The rolling door system 100 may include additional features that are not shown. For example the rolling door system 100 may include tension springs, an operator, a governor, a user interface to control operation of the rolling door, one or more sensors, and the like.

In one embodiment, the rolling door system 100 may include a curtain 102. The curtain 102 may include a plurality of panels $\mathbf{104}_1$ to $\mathbf{104}_n$ (hereinafter also referred to individually as a panel 104 or collectively as panels 104). The panels 104 may be coupled together via interlocking ends that form movable hinges. The hinges may form beads $\mathbf{106}_1$ to $\mathbf{106}_m$ (hereinafter also referred to individually as a bead 106 or collectively as beads 106).

The curtain 102 may also include a connection bracket 108. The connection bracket 108 may be mechanically coupled to a barrel 110 via one or more bead saddle attachment components $\mathbf{114}_1$ to $\mathbf{114}_o$ (hereinafter also referred to individually as a bead saddle attachment component 114 or collectively as bead saddle attachment components 114) of the present disclosure. The connection bracket 108 may be coupled to a spacer bracket 120 via a mechanical fastener 118 (e.g., a screw, bolt, and the like).

The curtain system 100 may also include a track system that includes a first guide $\mathbf{116}_1$ and a second guide $\mathbf{116}_2$. A first side of the curtain 102 may be inserted into the first guide $\mathbf{116}_1$ and a second side of the curtain 102 may be inserted into the second guide $\mathbf{116}_2$. The first guide $\mathbf{116}_1$ and the second guide $\mathbf{116}_2$ may help control movement of the curtain 102 as the curtain 102 is opened and closed.

The rolling door system 100 may also include a motor 112. The motor 112 may be coupled to the barrel 110. The motor 112 may drive the barrel 110 to rotate the barrel 110 in clockwise or counterclockwise direction as shown by an arrow 132. The motor 112 may rotate the barrel 110 to open or close the curtain 102, as shown by an arrow 130.

Although FIG. 1 illustrates an example with a motor 112, it should be noted that the barrel 110 can also be driven manually without a motor 112. For example, the barrel 110 can be rotated via a manual push-up, via hand crank operation, or via chain operation.

When the curtain 102 is opened, the curtain 102 may be wrapped around the barrel 110. In one embodiment, the bead saddle attachment components 114 coupled to the barrel 110 may help ensure that the curtain 102 is tightly wrapped around the barrel 110 for a minimal diameter when the curtain 102 is completely wrapped around the barrel 110. For example, the bead saddle attachment components 114 may include features (discussed in further detail below) that can "catch" the beads 106 of the curtain 102 to ensure a first wrap around the barrel 110 is as tight as possible. In other words, the bead saddle attachment components 114 may include features that minimize or eliminate any gaps between the surface of the curtain 102 and the exterior surface of the bead saddle attachment components 114.

In addition, the bead saddle attachment components 114 may be aligned to be square. As a result, the curtain 102 may open and close without drift. Drift may occur when the curtain 102 is wrapped unevenly around the barrel 110 due to one side of the curtain 102 being higher or lower than the other side of the curtain. This may occur when the curtain 102 is not attached "squarely" to the barrel 110.

In one embodiment, the barrel 110 may include a plurality of bead saddle attachment components 114. The plurality of bead saddle attachment components 114 may be deployed in pairs. For example, the bead saddle attachment components $\mathbf{114}_1$ and $\mathbf{114}_2$ may be a first pair, the bead saddle attachment components $\mathbf{114}_3$ and $\mathbf{114}_4$ may be a second pair, and so forth. Although six bead saddle attachment components 114 are illustrated in FIG. 1, it should be noted that any number of bead saddle attachment components 114 may be deployed. For example, two or more bead saddle attachment components 114 may be coupled to the barrel 110.

Although the bead saddle attachment component 114 has a generally circular shape or a ring shape, it should be noted that the bead saddle attachment component 114 may have any polygonal shape. For example, the interior surface of the bead saddle attachment component 114 may have a shape that matches the shape of the barrel 110. The outer surface of the bead saddle attachment component 114 may have any polygonal shape. The inner surface and the outer surface may have different shapes. For example, the inner surface may have a circular shape to match the barrel and the outer surface may have a hexagonal shape or non-circular shape. Thus, the example images of the bead saddle attachment component 114 illustrated in the Figures should not be considered limiting.

Each pair of bead saddle attachment components 114 may include a spacer bracket $\mathbf{120}_1$ to $\mathbf{120}_p$ (hereinafter also referred to individually as a spacer bracket 120 or collectively as spacer brackets 120). The spacer bracket 120 may be used to help secure the curtain 102 to the barrel 110, as described above.

In addition, the spacer bracket 120 may also ensure that the bead saddle attachment components 114 in each pair of bead saddle attachment components 114 are spaced apart by an equal distance 134. For example, the distance 134 between the bead saddle attachment components $\mathbf{114}_1$ and $\mathbf{114}_2$ may be the same as the distance 134 between the bead saddle attachment components $\mathbf{114}_3$ and $\mathbf{114}_4$.

Figure 2:
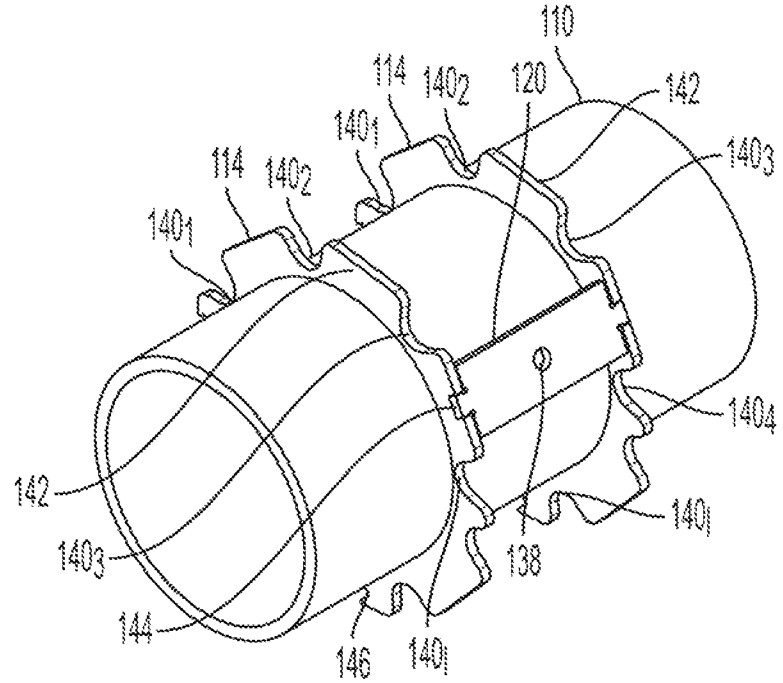
FIG. 2 is an isometric view of a portion of a barrel with the example bead saddle attachment components of the present disclosure.

FIG. 2 illustrates an isometric view of an example pair of bead saddle attachment components 114 on a portion of the barrel 110. The bead saddle attachment components 114 may have a generally circular shape with various features formed around an exterior side 142, outer periphery, or edge of each bead saddle attachment component 114. The barrel 110 may be slid through a central opening of each bead saddle attachment component 114.

Figure 5:
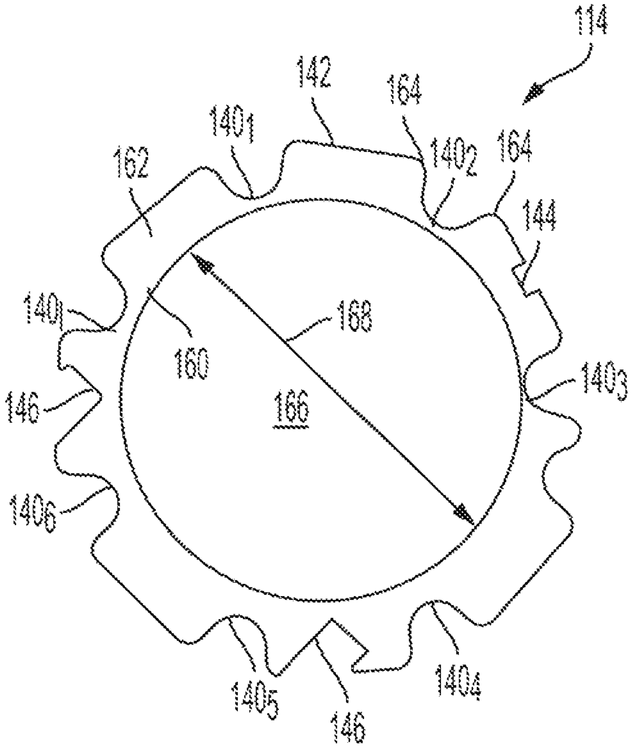
FIG. 5 is a side view of an example bead saddle attachment component of the present disclosure.

FIG. 5 illustrates a more detailed view of the bead saddle attachment component 114. The bead saddle attachment component 114 may have a generally circular body 162. The bead saddle attachment component 114 may be fabricated from steel, metal, or a thermoplastic (e.g., Delrin®). The bead saddle attachment component 114 may be formed via a stamping process, mold process, or cut from a piece of steel, metal, or thermoplastic.

The bead saddle attachment component 114 may have a central opening 166 formed by an interior surface or edge 160. The central opening 166 may have a diameter 168 that is similar to the outer diameter of the barrel 110. Thus, the barrel 110 may be fitted through the central opening 166 of the bead saddle attachment component 114. The bead saddle attachment component 114 may be attached to the barrel 110 by a weld or other permanent fastener.

Figure 3:
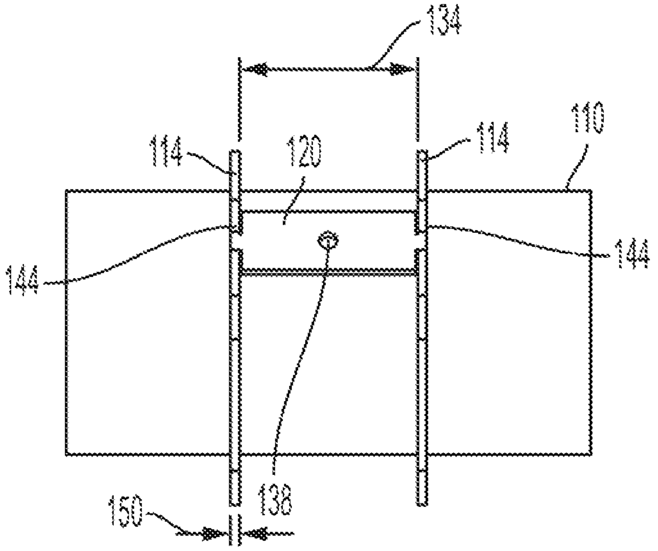
FIG. 3 is a front view of a portion of a barrel with the example bead saddle attachment components of the present disclosure.

Referring back to FIG. 2, the bead saddle attachment components 114 may be spaced apart from one another by a spacer bracket 120. FIG. 3 illustrates a front view of the portion of the barrel 110 and the bead saddle attachment components 114. The spacer bracket 120 may maintain a distance 134 between the pair of bead saddle attachment components 114. FIG. 3 also illustrates that each of the bead saddle attachment components 114 has a thickness 150.

The spacer bracket 120 may have at least one opening 138 to receive the mechanical fastener 118 that couples the connection bracket 108 to the spacer bracket 120. The bead saddle attachment component 114 may include a spacer bracket receiving feature 144 to receive an end of the spacer bracket 120. The spacer bracket receiving feature 144 may be a notch, cut-out, or slot formed along an outer edge of the bead saddle attachment component 114. The notch may have a size and shape that is similar to the size and shape of an end of the spacer bracket receiving feature 144.

Figure 6:
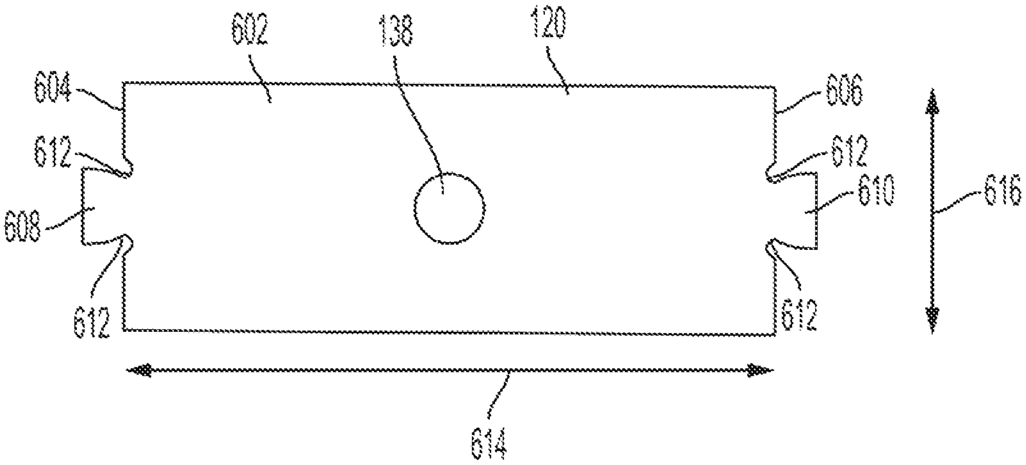
FIG. 6 is a top view of an example spacer bracket of the present disclosure.

FIG. 6 illustrates a more detailed view of the spacer bracket 120. The spacer bracket 120 may be stamped or formed from a single piece of metal or plastic. The spacer bracket 120 may have a body 602 having a length 614 and a width 616. The spacer bracket 120 may include a first member 608 that extends from a first edge 604 and a second member 610 that extends from a second side 606 of the body 602.

In one embodiment, the first member 608 and the second member 610 may be a piece that extends away from the first edge 604 and the second edge 606, respectively. The first member 608 and the second member 610 may each have a generally rectangular shape with a neck that extends the first member 608 and the second member 610 away from the first edge 604 and the second edge 606, respectively.

In one embodiment, the first member 608 and the second member 610 may include notches 612. The notches 612 may have a circular shape to provide some tolerance to allow the first member 608 and the second member 610 to fit in the spacer bracket receiving feature 144. The notches 612 may also help secure the spacer bracket 120 to the spacer bracket receiving feature 144 of the bead saddle attachment components 114. The notches 612 may help to prevent the spacer bracket 120 from moving or falling out of the spacer bracket receiving feature 144 of the bead saddle attachment components 114.

Figure 4:
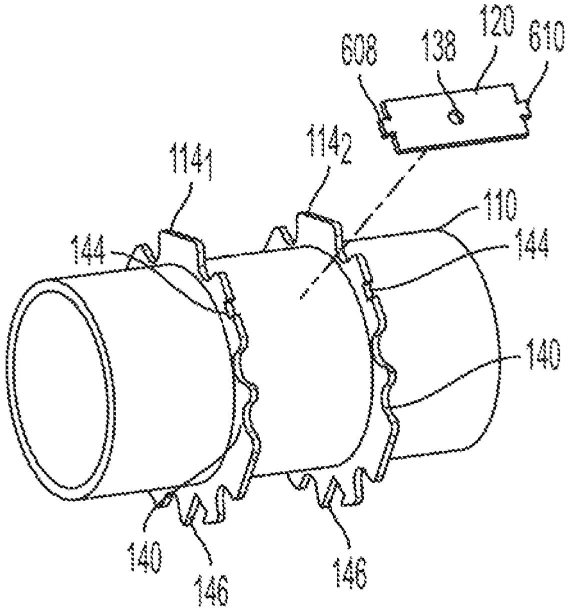
FIG. 4 is an isometric front a portion of a barrel with the example bead saddle attachment components and a spacer bracket of the present disclosure.

The first member 608 may be placed into the spacer bracket receiving feature 144 of a first bead saddle attachment component 114, and the second member 610 may be placed into the spacer bracket receiving feature 144 of a second bead saddle attachment component 114. FIG. 4 illustrates an exploded view of the spacer bracket 120 and the bead saddle attachment components $114_1$ and $114_2$. FIG. 4 helps to illustrate how the first member 608 is inserted into the spacer bracket receiving feature 144 of the first bead saddle attachment component $114_1$ and the second member 610 may be placed into the spacer bracket receiving feature 144 of a second bead saddle attachment component $114_2$.

Referring back to FIG. 2, the bead saddle attachment components 114 may also include a plurality of bead saddle features $140_1$ to $140_l$ (also herein referred to individually as a bead saddle feature 140 or collectively as bead saddle features 140) and an alignment feature 146. FIG. 5 illustrates a more detailed view of the bead saddle attachment component 114 with the spacer bracket receiving feature 144, the bead saddle features 140 and the alignment feature 146.

In one embodiment, the bead saddle features 140 may be formed by a shape that is cut out of an edge around the exterior side 142 of the bead saddle attachment components 114. The exterior side 142 may be defined as the side that is positioned towards the outer circumference of the bead saddle attachment component 114. The edge may be defined as the surface having the width 150 that runs along the outer circumference of the bead saddle attachment component 114.

The cut-out may have a generally semi-circular (e.g., half of a circle), a curved, or parabolic shape. However, it should be noted that the cut-out of the bead saddle feature 140 may have any shape that is similar to the shape of the beads 106 of the curtain 102, illustrated in FIG. 1.

In one embodiment, the bead saddle features 140 may have rounded corners 164. The rounded corners 164 allows for smoother entry and exit of the beads 106 from the bead saddle features 140 as the curtain 102 is opened and closed.

In one embodiment, the bead saddle features 140 may be spaced evenly apart around the exterior side 142, or outer circumference, of the bead saddle attachment component 114. The spacing of the bead saddle features 140 may correspond to the height of the panel. The diameter of the bead saddle attachment component 114 may be selected to correspond to a desired number of panels needed to form an initial wrap. For example, for larger curtains 102, a large bead saddle attachment component 114 may be deployed that may have ten bead saddle features 140. For a smaller curtain 102, a smaller bead saddle attachment component 114 may be deployed that may have six bead saddle features 140. It should be noted that the numbers of bead saddle features 140 are provided as examples to illustrate how the number may vary based on the size of the bead saddle attachment component 114, and any number of bead saddle features 140 may be deployed.

Although the figures illustrate the bead saddle features 140 as being cut-outs on an exterior side 142 of the bead saddle attachment component 114, it should be noted the bead saddle features 140 may also be deployed via other mechanisms. For example, the bead saddle features 140 may include a textured outer surface along the outer circumference or edge of the bead saddle attachment component 114. For example, the textured surface may include a roughened edge, teeth formed in the outer edge, a pattern of textured shapes formed along the outer edge, and so forth. The textured surface may increase friction to "catch" the beads 106 of the curtain 102.

In another example, the bead saddle feature 140 may include a layer of material on the outer circumference or edge of the bead saddle attachment component 114. For example, a layer of rubber may be attached to the outer edge to increase friction to "catch" the beads 106 of the curtain 102.

Figure 7:
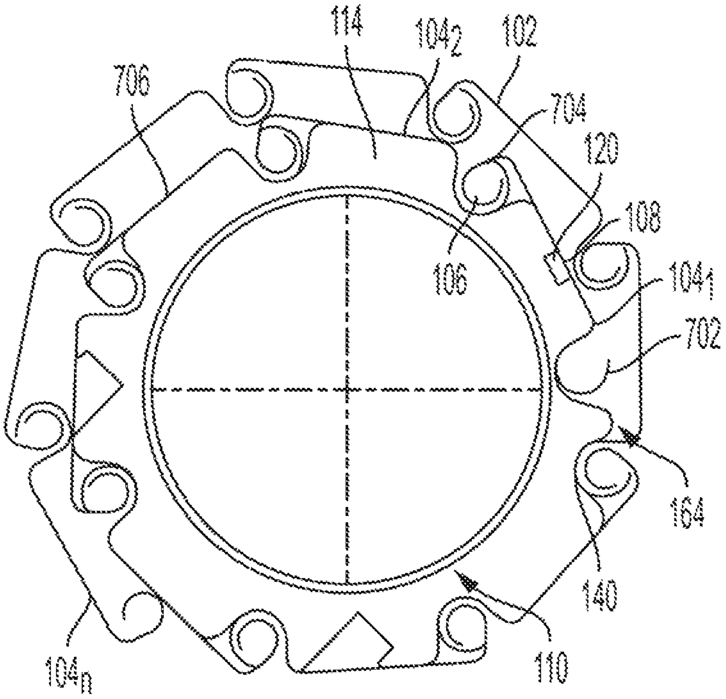
FIG. 7 is a cross-sectional side view of the a rolling door wrapped around a barrel with the example bead saddle attachment components of the present disclosure.

FIG. 7 illustrates a cross-sectional side view of the curtain 102 that is wrapped around the bead saddle attachment component 114 of the present disclosure. FIG. 7 illustrates a view of a first end 702 and a second end 704 of each panel 104 of the curtain 102. The first end 702 and the second end 704 may be deployed as open cylinders that run along a length on opposite sides of each panel 104. The circumference of the second end 704 may be slightly smaller than the circumference of the first end 702. The second end 704 of a first panel 104 may be interlocked with a first end 702 of an adjacent panel 104. For example, the second end 704 of the panel $104_1$ may be inserted concentrically into the first end 702 of the adjacent panel $104_2$. The circular cross-sectional shape of the interconnected first end 702 and the second end 704 may form the beads 106 of the curtain 102.

As illustrated in FIG. 7, as the curtain 102 opens, the curtain 102 begins wrapping around the bead saddle attachment component 114. The beads 106 are caught by the bead saddle features 140. As a result, the initial wrap or first layer 706 of the curtain 102 may be wrapped tightly around the barrel 110 via the bead saddle attachment component 114. For example, there is minimal to no gap between the surface of the panels 104 in the first layer 706 and the exterior side 142 of the bead saddle attachment component 114. The bead saddle features 140 ensure a consistent wrap of the curtain 102 around the bead saddle attachment component 114 each time the curtain 102 is opened.

Referring back to FIG. 5, the alignment feature 146 may include a channel that is cut out of an edge along the exterior side 142 of the bead saddle attachment component 114. The channel may be cut out on a portion of the bead saddle attachment component 114 that is positioned between two bead saddle features 140. The channel may have a generally rectangular shape that is similar to the shape of an edge of a C-channel that is used to align the bead saddle attachment components 114 during manufacturing.

The alignment feature 146 may be located on a side of the bead saddle attachment component 114 that is opposite the spacer bracket receiving feature 144. For example, if the bead saddle attachment component 114 were divided in half by the line 168 representing the diameter, the spacer bracket receiving feature 144 may be located on the exterior side 142 of a first half and the alignment feature 146 may be located on the exterior side 142 of a second half.

In one embodiment, the bead saddle attachment component 114 may include two alignment features 146. For example a first alignment feature 146 may be cut on a first portion of the bead saddle attachment component 114 that is positioned between bead saddle features $\mathbf{140}_6$ and $\mathbf{140}_7$ and the second alignment feature 146 may be cut on a second portion of the bead saddle attachment component 114 that is positioned between bead saddle features $\mathbf{140}_4$ and $\mathbf{140}_5$. Said another way, the two alignment features 146 may be cut out on two portions of the exterior side 142 of the bead saddle attachment component 114 that are positioned between adjacent pairs of bead saddle features 140.

Figure 9:
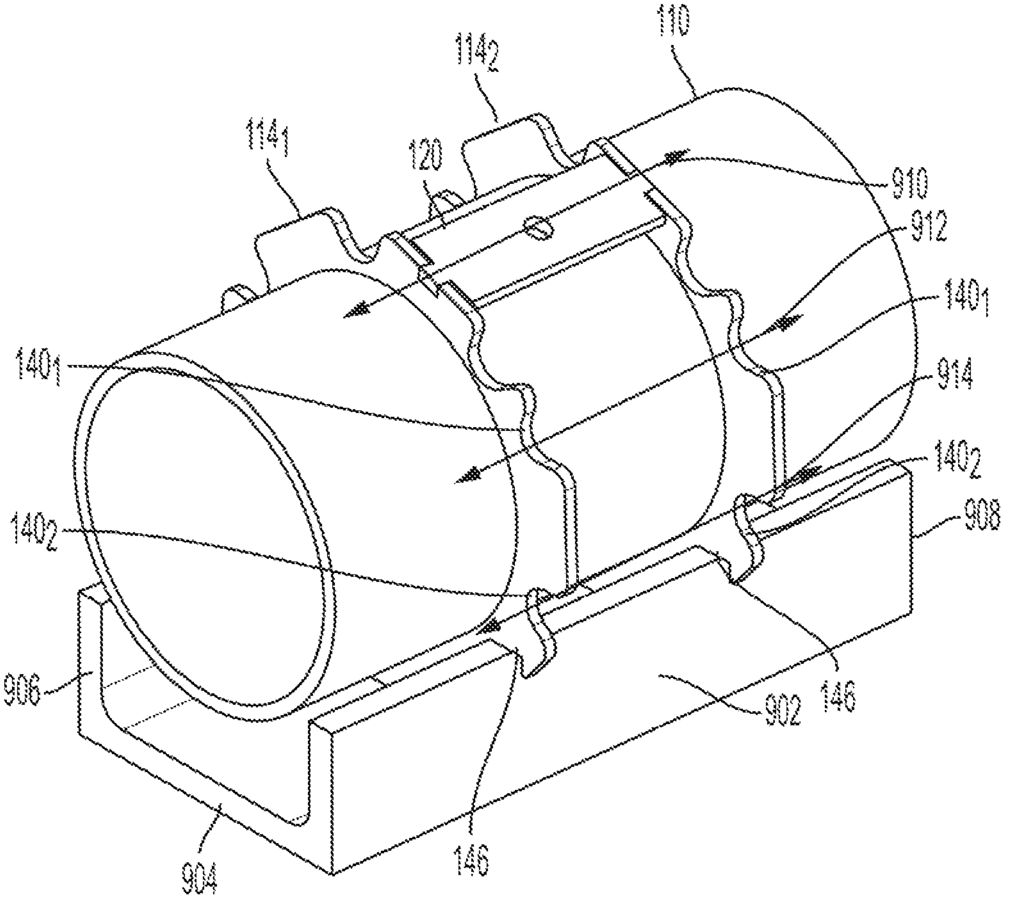
FIG. 9 is an isometric view of a portion of a barrel with the example bead saddle attachment components set in a C-channel to align the bead saddle attachment components of the present disclosure.
Figure 10:
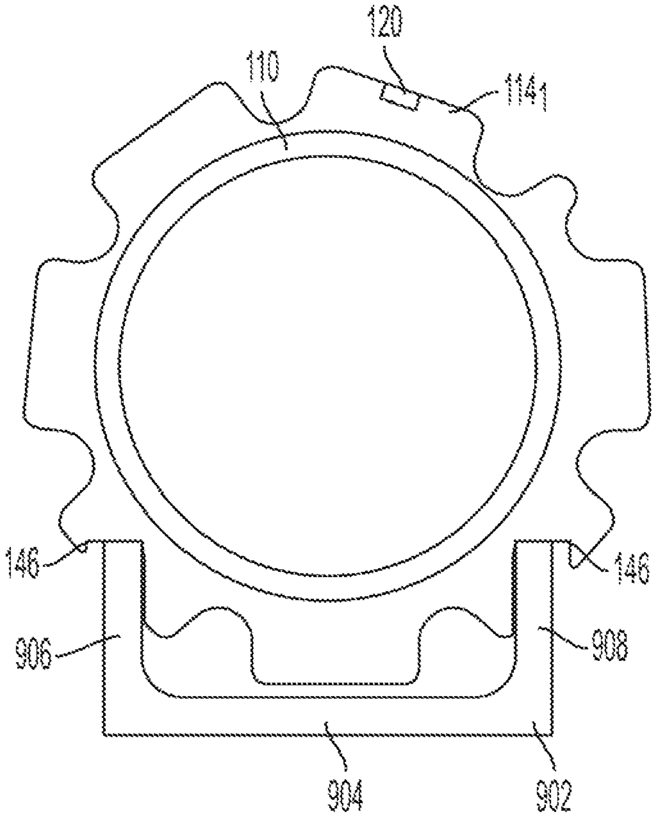
FIG. 10 is side view of a portion of a barrel with the example bead saddle attachment components set in a C-channel of the present disclosure.

The alignment feature 146 may be used to align the bead saddle attachment components 114 on the barrel 110 during manufacturing of the barrel 110 and the bead saddle attachment components 114. FIG. 9 illustrates an isometric view of the alignment feature 146 used with a C-channel 902, and FIG. 10 illustrates a side view of the alignment feature 146 used with the C-channel 902.

In one embodiment, the C-channel 902 may include a body 904 and lateral sides 906 and 908. The lateral sides 906 and 908 may be perpendicular or normal to the body 904 and on opposite sides of the body 904. FIG. 10 illustrates a cross-sectional view of the C-channel 904 and illustrates how the body 904 and the lateral sides 906 and 908 form a "C" shape (e.g., the letter "C" on its side or a "U" shape).

During manufacturing, the alignment features 146 may be coupled to the C-channel 902 to align all of the bead saddle attachment components 114. For example, a first lateral side 906 may be inserted into the channel of the first alignment feature 146 and the second lateral side 908 may be inserted into the channel of the second alignment feature 146.

As discussed above, the combination of the C-channel 902 and the alignment feature 146 allows all of the bead saddle attachment components 114 on the barrel 110 to be square. In other words, a center of the spacer bracket receiving feature 144 of the bead saddle attachment components $\mathbf{114}_1$ and $\mathbf{114}_2$ may lie on a straight line 910. A center of the bead saddle feature $\mathbf{140}_1$ of the bead saddle attachment component $\mathbf{114}_1$ and the bead saddle feature $\mathbf{140}_1$ of the bead saddle attachment component $\mathbf{114}_2$ may lie on a straight line 912. A center of the bead saddle feature 1402 of the bead saddle attachment component $\mathbf{114}_1$ and the bead saddle feature 1402 of the bead saddle attachment component $\mathbf{114}_2$ may lie on a straight line 914, and so forth. FIG. 10 illustrates how only the bead saddle attachment component $\mathbf{114}_1$ can be seen in the side view due to the square alignment of the bead saddle attachment component $\mathbf{114}_1$ and the bead saddle attachment component $\mathbf{114}_2$.

Figure 8:
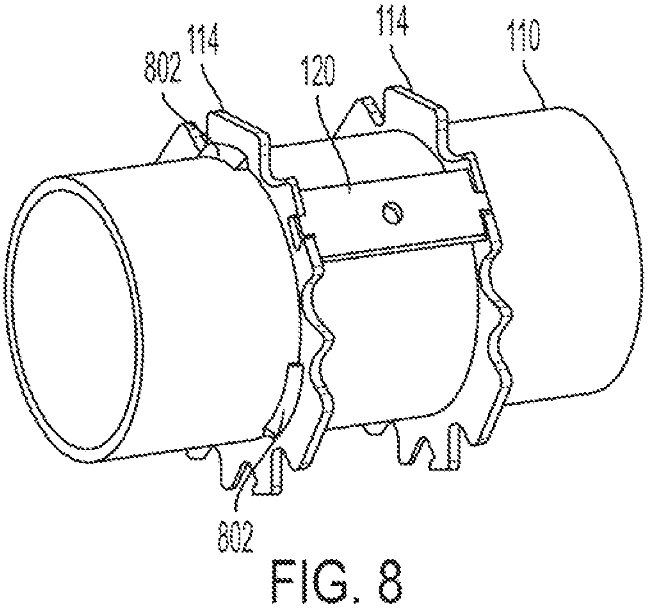
FIG. 8 is an isometric view of a portion of a barrel with the example bead saddle attachment components secured with weldments of the present disclosure of the present disclosure.

In one embodiment, the bead saddle attachment components 114 may be affixed to the barrel 110. In other words, the bead saddle attachment components 114 may be coupled to the barrel 110 such that the bead saddle attachment components 114 may not be moved or rotated laterally or around the barrel 110. For example, while the bead saddle attachment components 114 are aligned on the C-channel 902, weldments 802 may be added to the barrel and the bead saddle attachment components 114, as illustrated in FIG. 8.

The weldments 802 may be a welding (e.g., melting together via a heat source or torch) of a portion of the bead saddle attachment component 114 to a portion of the barrel 110. In another embodiment, the weldments 802 may be mechanical fasteners to couple the bead saddle attachment component 114 to the barrel 110. In another embodiment, the weldments 802 may be separate components that are glued or attached via an adhesive to the bead saddle attachment component 114 and the barrel 110.

Figure 11:
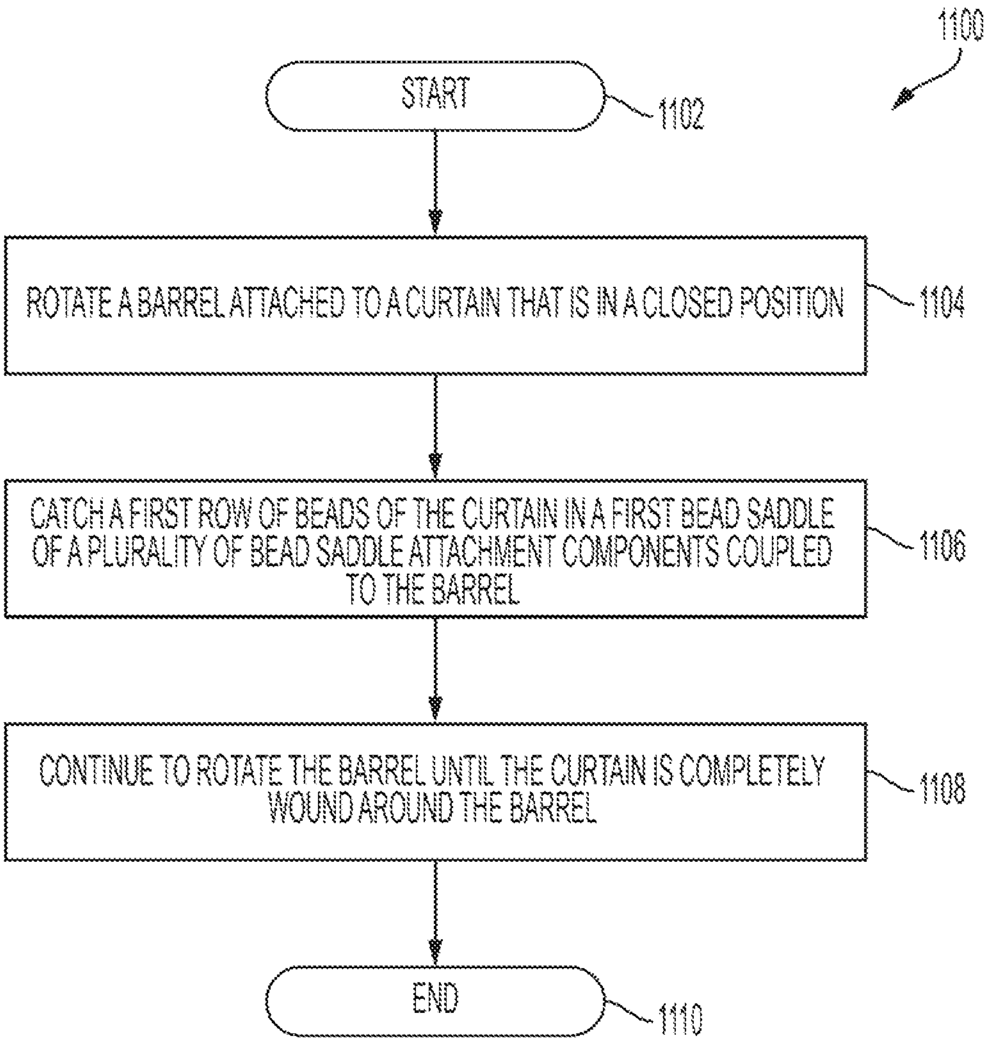
FIG. 11 is a flow chart of a method for opening a curtain of a rolling door system of the present disclosure.

FIG. 11 illustrates a flow chart of a method 1100 for opening a curtain of a rolling door system. In one embodiment, the method 1100 begins at block 1102. At block 1104, the method 1100 rotates a barrel attached to a curtain that is in a closed position. For example, the curtain may be unwound from the barrel to block an opening where the rolling door system is installed.

At block 1106, the method 1100 catches a first row of beads of the curtain in a first bead saddle of a plurality of bead saddle attachment components coupled to the barrel. For example, each of the bead saddle attachment components may have a ring shape. The barrel can be inserted through the inner opening of the bead saddle attachment components.

The bead saddle attachment components may be aligned via an alignment feature of the bead saddle attachment components when the bead saddle attachment components are attached to the barrel. The alignment may ensure that the bead saddles of each of the plurality of bead saddle attachment components are aligned horizontal to ensure that the curtain is square (e.g., the heights of the bottom left side and the bottom right side of the curtain are equal as the curtain is being wound around the barrel).

At block 1108, the method 1100 continues to rotate the barrel until the curtain is completely wound around the barrel. In other words, the method 1100 may continue to rotate the barrel until the curtain is in the open position.

In one embodiment, the bead saddle attachment components may include multiple bead saddles. Thus, as the barrel is rotated, a second row of beads of the curtain may be "caught" by a second bead saddle of each of the bead saddle attachment components. A third row of beads of the curtain may be "caught" by a third bead saddle of each of the bead saddle attachment components, and so forth, until the first a wrap of the curtain is completed around the barrel and the bead saddle attachment components. Subsequently, the curtain would be wrapped around itself until the curtain is completely wound around the barrel or in the open position. At block 1110, the method 1100 ends.

Thus, the present disclosure provides various embodiments of the bead saddle attachment component 114 which may be used for curtains 102. The bead saddle attachment component 114 may include an alignment feature 142 that can be used during manufacturing to align all of the bead saddle attachment components 114 around the barrel 110 to prevent drift during rotation of the barrel. In addition, the bead saddle attachment component 114 may include bead saddle features 140 that can catch the beads 106 of the curtain 102. The bead saddle features 140 may ensure a tight and consistent wrap around the barrel 110 to minimize a diameter of the wrapped curtain 102 around the barrel 110.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A bead saddle attachment component, comprising:
- a body;
- a plurality of bead saddle features on an exterior side of the body;
- a spacer bracket receiving feature on the exterior side of the body to receive a spacer bracket that ensures the bead saddle attachment component when paired with a second bead saddle attachment component are spaced apart by an equal distance as other pairs of bead saddle attachment components on a barrel; and
- an alignment feature on the exterior side of the body to align the bead saddle attachment component with second bead saddle attachment component and the other pairs of bead saddle attachment components on the barrel wherein the alignment feature comprises:
  - a first channel cut out along an edge of the exterior side of the body and positioned between a first pair of the plurality of bead saddle features; and
  - a second channel cut out along the edge of the exterior side of the body and positioned between a second pair of the plurality of bead saddle features.

2. The bead saddle attachment component of claim 1, wherein the plurality of bead saddle features is evenly spaced apart around the exterior side of the body.

3. The bead saddle attachment component of claim 1, wherein each bead saddle feature of the plurality of bead saddle features comprises a semi-circular shape that is cut out from an edge of the exterior side of the body.

4. The bead saddle attachment component of claim 3, wherein the semi-circular shape matches an exterior surface shape of a bead of a rolling door.

5. The bead saddle attachment component of claim 1, wherein the spacer bracket receiving feature comprises a notch cut out along an edge of the exterior side of the body and positioned between two bead saddle features of the plurality of bead saddle features.

6. The bead saddle attachment component of claim 1, wherein the alignment feature is located opposite from the spacer bracket receiving feature.

7. The bead saddle attachment component of claim 1, wherein the body further comprises:
- an interior surface to form an opening to receive a barrel of a rolling door system.

8. An apparatus for a rolling door system, comprising:
- a barrel;
- a first bead saddle attachment component; and
- a second bead saddle attachment component, wherein the barrel is fitted through a central opening of the first bead saddle attachment component and a central opening of the second bead saddle attachment component, wherein the first bead saddle attachment component and the second bead saddle attachment component each comprise:
  - a body;
  - a plurality of bead saddle features on an exterior side of the body;
  - a spacer bracket receiving feature on the exterior side of the body to receive a spacer bracket that ensures the first bead saddle attachment component and the second bead saddle attachment component are spaced apart by an equal distance as other pairs of bead saddle attachment components on the barrel; and
- an alignment feature on the exterior side of the body to align the first bead saddle attachment component with second bead saddle attachment component and the other pairs of bead saddle attachment components on the barrel, wherein the alignment feature comprises:
  - a first channel cut out along an edge of the exterior side of the body and positioned between a first pair of the plurality of bead saddle features; and
  - a second channel cut out along the edge of the exterior side of the body and positioned between a second pair of the plurality of bead saddle features.

9. The apparatus of claim 8, wherein the spacer bracket comprises:
- a body;
- a first member extending out of a first edge of the body; and
- a second member extending out of a second edge of the body, wherein the first edge and the second edge are positioned on opposing ends of the body.

10. The apparatus of claim 9, wherein the first member is coupled to the spacer bracket receiving feature of the first bead saddle attachment component and the second member is coupled to the spacer bracket receiving feature of the second bead saddle attachment component, such that the first bead saddle attachment component and the second bead saddle attachment component are aligned around the barrel.

11. The apparatus of claim 8, wherein the spacer bracket further comprises at least one opening to receive a mechanical fastener to attach a curtain.

12. The apparatus of claim 8, further comprising:
- a plurality of weldments on the first bead saddle attachment component and the second bead saddle attachment component to affix the first bead saddle attachment component and the second bead saddle attachment component to the barrel.

13. The apparatus of claim 8, further comprising:
- a C-channel to align the first bead saddle attachment component and the second bead saddle attachment component on the barrel, the C-channel comprising:
- a first lateral side;
- a bottom side; and
- a second lateral side, wherein the first lateral side is formed along a first lateral edge of the bottom side and the second lateral side is formed along a second lateral edge of the bottom side, wherein the first lateral side and the second lateral side are opposite edges of the bottom side.

14. The apparatus of claim 13, wherein the first lateral side of the C-channel is inserted into the first channel and wherein the second lateral side of the C-channel is inserted into the second channel.

15. The apparatus of claim 8, wherein the plurality of bead saddle features is evenly spaced apart around the exterior side of the body of the first bead saddle attachment component and the second bead saddle attachment component.

16. A rolling door system, comprising:

a barrel;

a first bead saddle attachment component coupled to the barrel;

a second bead saddle attachment component coupled to the barrel;

a spacer bracket coupled to the first bead saddle attachment component and the second bead saddle attachment component to ensure that the first bead saddle attachment component and the second bead saddle attachment component are spaced apart by an equal distance as other pairs of bead saddle attachment component on the barrel; and a curtain coupled to the spacer bracket, wherein the curtain comprises a plurality of slats movably coupled together to form a plurality of beads along hinges formed where the plurality of slats are movably coupled together, wherein the first bead saddle attachment component and the second bead saddle attachment component each comprises:

a body;

a plurality of bead saddle features on an exterior side of the body to receive a bead of the curtain when the curtain is rotated into an open position; and a spacer bracket receiving feature on the exterior side of the body to receive an end of the spacer bracket; and an alignment feature on the exterior side of the body to align the first bead saddle attachment component with second bead saddle attachment component and the other pairs of bead saddle attachment components on the barrel, wherein the alignment feature comprises:

a first channel cut out along an edge of the exterior side of the body and positioned between a first pair of the plurality of bead saddle features; and a second channel cut out along the edge of the exterior side of the body and positioned between a second pair of the plurality of bead saddle features.

17. The rolling door system of claim 7, wherein the first bead saddle attachment component and the second bead saddle attachment component are aligned along a length of the barrel via a C-channel coupled to the alignment feature of the first bead saddle attachment component and the second bead saddle attachment component during manufacturing of the barrel.

18. The rolling door system of claim 16, further comprising:

a third bead saddle attachment component coupled to the barrel;

a fourth bead saddle attachment component coupled to the barrel; and a second spacer bracket coupled to the third bead saddle attachment component and the fourth bead saddle attachment component, wherein the spacer bracket coupled to the first bead saddle attachment component and the second bead saddle attachment component sets a first predefined distance between the first bead saddle attachment component and the second bead saddle attachment component, and the second spacer bracket coupled to the third bead saddle attachment component and the fourth bead saddle attachment component sets a second predefined distance between the third bead saddle attachment component and the fourth bead saddle attachment component, wherein the first predefined distance is equal to the second predefined distance.

* * * * *